US011481438B2

(12) United States Patent
Deng et al.

(10) Patent No.: US 11,481,438 B2
(45) Date of Patent: Oct. 25, 2022

(54) WATCH SEQUENCE MODELING FOR RECOMMENDATION RANKING

(71) Applicant: HULU, LLC, Santa Monica, CA (US)

(72) Inventors: Kaiwen Deng, Beijing (CN); Yunsheng Jiang, Beijing (CN); Xiaohui Xie, Beijing (CN); Brian Morrison, Seattle, WA (US); Jiarui Yang, Beijing (CN); Christopher Russell Kehler, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 114 days.

(21) Appl. No.: 17/064,286

(22) Filed: Oct. 6, 2020

(65) Prior Publication Data

US 2021/0374178 A1   Dec. 2, 2021

Related U.S. Application Data

(60) Provisional application No. 63/029,809, filed on May 26, 2020.

(51) Int. Cl.
*G06F 16/735* (2019.01)
*G06N 3/08* (2006.01)
*G06N 3/04* (2006.01)
*G06F 16/2457* (2019.01)

(52) U.S. Cl.
CPC ...... *G06F 16/735* (2019.01); *G06F 16/24578* (2019.01); *G06N 3/04* (2013.01); *G06N 3/08* (2013.01)

(58) Field of Classification Search
CPC ............. G06F 16/735; G06F 16/24578
See application file for complete search history.

(56) References Cited

U.S. PATENT DOCUMENTS

| | | | |
|---|---|---|---|
| 2003/0138505 A1* | 7/2003 | Fischer | A61K 9/7061 424/744 |
| 2009/0006368 A1* | 1/2009 | Mei | H04N 21/4667 707/999.005 |
| 2018/0225710 A1* | 8/2018 | Kar | G06Q 30/0254 |
| 2021/0274256 A1* | 9/2021 | Kadam | H04N 21/4662 |
| 2021/0357966 A1* | 11/2021 | Michel | G06Q 20/36 |

OTHER PUBLICATIONS

Guorui Zhou et al., "Deep Interst Network for Click-Through Rate Predication", https://arxiv.org/abs/1809.03672, Sep. 13, 2018, 9 pages.
Fei Sun et al., "BERT4Rec: Sequential Recommendation with Bidirectional Encoder Representations from Transformer", https://arxiv.org/abs/1904.06690, Aug. 21, 2019, 11 pages.

* cited by examiner

*Primary Examiner* — Robert W Beausoliel, Jr.
*Assistant Examiner* — Pedro J Santos
(74) *Attorney, Agent, or Firm* — Kwan & Olynick LLP

(57) ABSTRACT

In some embodiments, a method selects a sequence of programs watched by a user account. The method calculates a first set of weights based on comparing content of the sequence of programs to content of a target program and calculates a second set of weights based on an order of the sequence of the programs and the first of weights. The first set of weights and the second set of weights are applied to the sequence of programs to generate a prediction of a similarity of the sequence of programs to the target program. Then, the method outputs the prediction of the similarity for use in determining a recommendation for the user account.

20 Claims, 9 Drawing Sheets

WATCH SEQUENCE MODELING FOR RECOMMENDATION RANKING

CROSS REFERENCE TO RELATED APPLICATIONS

Pursuant to 35 U.S.C. § 119(e), this application is entitled to and claims the benefit of the filing date of U.S. Provisional App. No. 63/029,809 filed May 26, 2020, the content of which is incorporated herein by reference in its entirety for all purposes.

BACKGROUND

For a video delivery service provider, the time users spend on the service, such as by watching videos, is important. The service provider may use a recommendation system to recommend videos to a user to watch. The success of the recommendations may cause a user to continue to use the service by watching a video that is recommended.

When operating in an online environment, the recommendation system needs to generate the recommendations in real-time. However, some models that could be used by the recommendation system may not be able generate results in the time constraints of the online environment because of inherent limitations in computation speed.

BRIEF DESCRIPTION OF THE DRAWINGS

With respect to the discussion to follow and in particular to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
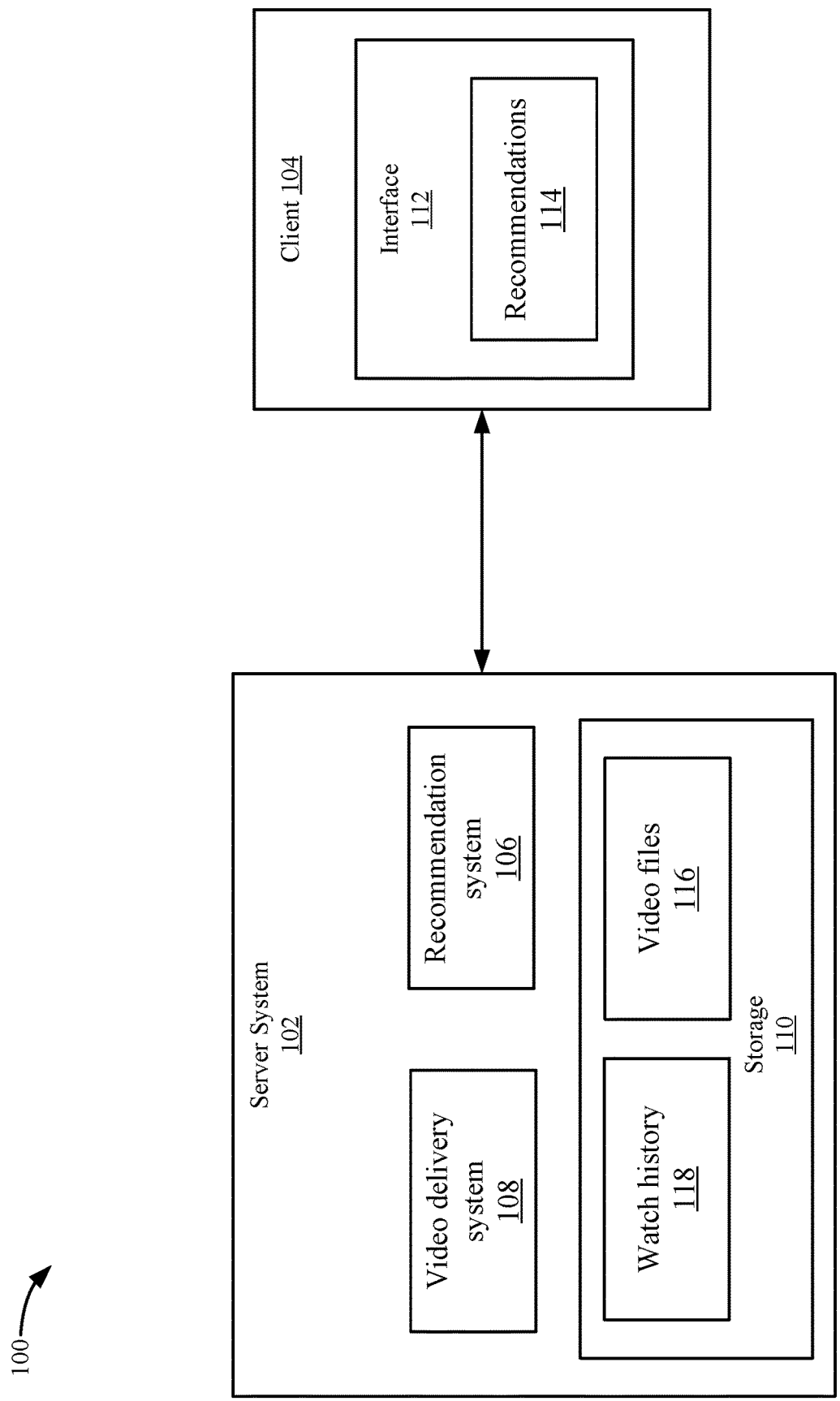
FIG. 1 depicts a simplified system for generating recommendations according to some embodiments.

Described herein are techniques for a recommendation system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A recommendation system may generate a list of eligible videos for a predictor, which can narrow down and rank the list. The predictor takes into account various aspects of information/metadata, such as the identity of a user account (e.g., profile information), the current context (e.g., time, device, location, etc.), the programs the user account has watched, the genres of the programs the user account has watched, and other information. The predictor then generates a prediction, such as a prediction of this user account's click through rate (CTR) when given a target program in the list.

To generate more relevant predictions, such as a better prediction of the click through rate, the recommendation system uses a user account's watch history. The watch history may be a sequence of representations for programs that were watched by the user account on the video delivery service. The representation may be an embedding, which may be a value that is represented in a content embedding space and represents characteristics of the program in the space. After receiving the watch history, the recommendation system may not directly average the embeddings for the programs in the watch history and use the averaged embedding as the representation of user's watch history. In some cases, using the average embedding may not be optimal. For example, in a user account's watch sequence, each program may have a different importance since some programs may be closer to a user account's interests and some programs may be more suitable than other programs considering the target program. Using an averaging of the embedding sequence may erase the differences between programs and the recommendation system treats each program that the user account watched equally when making predictions. The order may also matter in the watch sequence. For example, the order of watched programs might suggest the evolution of user account's interest, which is not reflected in an averaging of the embedding.

In contrast to using an averaging of the program embeddings, the recommendation system generates weights for programs in the watch history that take into account the importance of the content of a respective program in the watch history and also the importance of the order of the programs in the watch history with respect to a target program. The recommendation system generates weights for each program in the watch history, which are used to generate a prediction for the target program. For example, the recommendation system generates the click through rate for the target program using the weights. Upon generating a prediction for each of a list of target programs, the recommendation system can select one or more of the target programs to include in a recommendation for the user account.

System Overview

FIG. 1 depicts a simplified system 100 for generating recommendations according to some embodiments. A server system 102 ranks programs, which may be used to generate recommendations 114 for a client device 104. Although recommendations 114 are described, the ranking may be used for other purposes, such as for marketing purposes. A user account (e.g., an account used by one or more users) may use client device 104 and receive personalized recommendations 114 that are displayed on a user interface 112. Recommendations 114 may include one or more recommendations and may be displayed in different formats in user interface 112. For example, recommendations 114 may be displayed as search results, in collections (e.g., groupings), in advertisements, or in other formats in user interface 112. Although one client device is shown, server system may generate recommendations 114 for multiple client devices 104. For example, different user accounts may use different client devices 104 and server system 102 generates personalized recommendations 114 for each user account.

Server system 102 includes a video delivery system 108 that can deliver programs (e.g., videos) to clients 104, which can be viewed in user interface 112. A program may be any type of media content, such as a show, movie, clip, live event, live show, etc. A program may be a video, but may be other types of content, such as an image or an advertisement. A user account may be associated with one or more users and is used to log into and use a video delivery service offered by video delivery system 108.

While a user account is interacting with the video delivery service, video delivery system 108 may record user account behavior. User account behavior may include different actions taken by the user, such as what programs the user account watches, what recommendations the user account selects, and other actions taken while using the video delivery service. User account behavior may also include implicit feedback and explicit feedback from users. Explicit feedback may include which videos the user has selected. Implicit feedback may be implied from user actions on the service, such as videos the user did not select.

Storage 110 may include a watch history 118 and video files 116. Watch history 118 may include a list of programs that a user account has viewed. Since different user accounts may watch different programs, watch history 118 may vary per user account. Also, recommendation system 106 may use all of watch history 118 to generate recommendations 114 or a portion of watch history 118. A portion of watch history 118 may be the programs watched in the last week, two weeks, month, year, etc., or another list of programs that may or may not be related to time. Video files 116 may be videos that include content for the programs that are offered by video delivery system 108 and can be viewed by client 104.

Recommendation system 106 calculates weights for each program in a user's watch history sequence that considers the program viewing order and the characteristics of each program. These weights may be both content aware and sequence aware. Content aware weights consider the content of programs against the content of a target program. The sequence aware weights consider a position in the sequence of watch history 118 for each program against the content aware weights. Recommendation system 106 then ranks target programs based on the programs in watch history 118, which are weighted using the content aware weights and the sequence aware weights. Recommendation system 106 may output a ranking of target programs. Then, video delivery system 108 may display recommendations 114 based on the ranking of the target programs.

Accordingly, the weights may be based on an order of the programs in watch history 118 and the content of each program. The content of each program may provide insight in determining which programs in watch history 118 may are more important to a user account. Also, the use of the order may improve the recommendations because the order often provides some context of which programs may be more important in watch history 118. The outputted recommendations may perform better when the order and content are considered when generating recommendations. For example, the recommendations may receive more selections, such as selections to play back the associated programs.

Recommendation Engine

Figure 2:
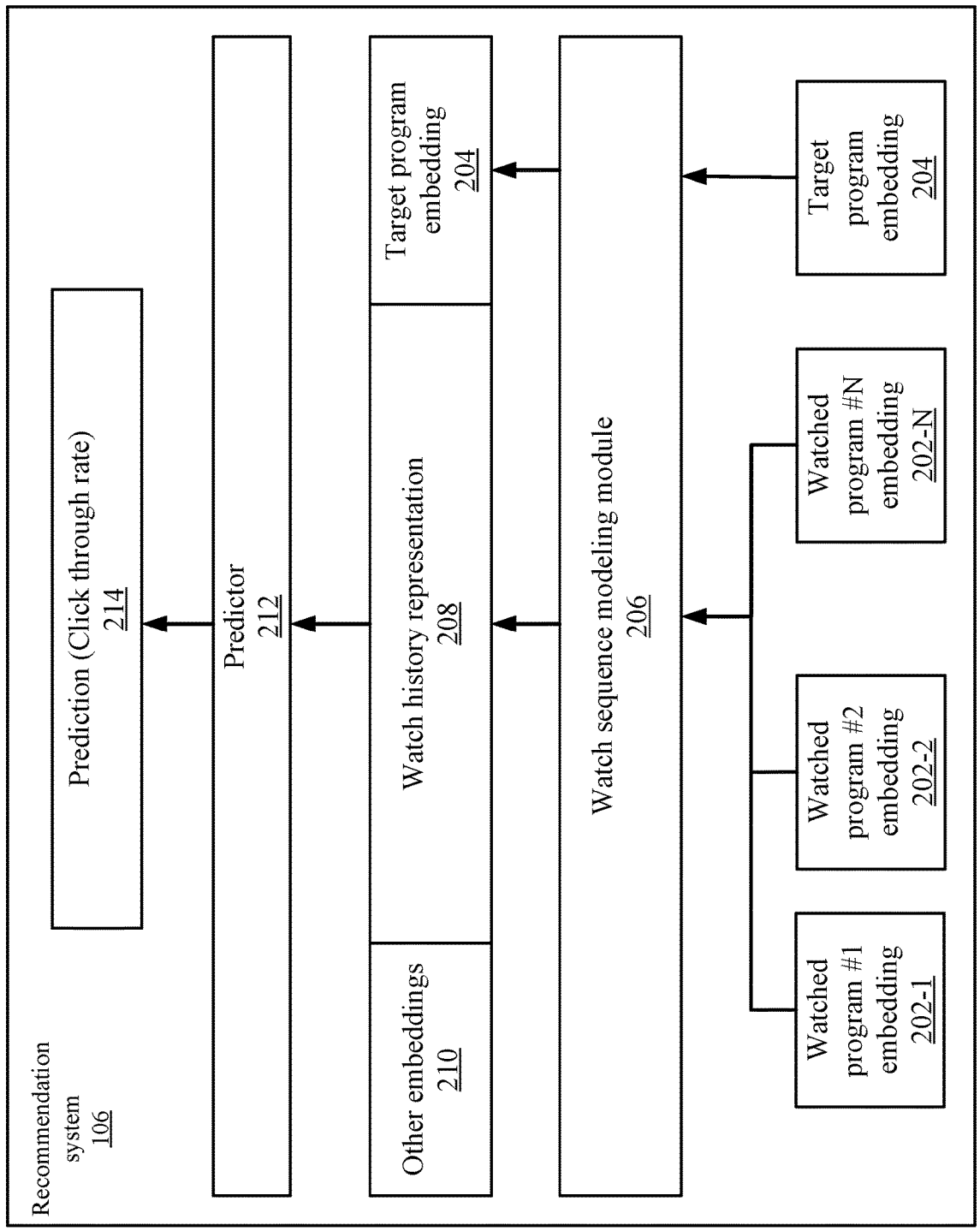
FIG. 2 depicts a more detailed example of a recommendation system according to some embodiments.

FIG. 2 depicts a more detailed example of recommendation system 106 according to some embodiments. Recommendation system 106 uses a watch history of programs 118, which may be one or more programs that have been watched by a user account. In some embodiments, a program may be represented by a representation that defines characteristics of the program within a space. For example, the representation may be an embedding, which is a multi-dimensional feature (e.g., an array of real numbers). The feature contains some sort of information for the program, such as the genre of the show and keywords associated with the program. The value of the feature is generated with the expectation that shows with similar characteristics will be near each other in an embedding space. The embedding may be generated at any time, such as before training of recommendation system 106 and using different models.

A watch sequence modeling module 206 receives a watched program #1 embedding 202-1 to a watched program #N embedding 202-N. Also, watch sequence modeling module 206 receives a target program embedding 204. The embedding is for the target program 204 in which the recommendation system will generate a prediction. The process will be described for a target program; however, in the recommendation process, recommendation system 106 may perform the process for multiple target programs to generate predictions for each target program. Recommendation system 106 then uses the predictions to rank the target programs among each other.

Watch sequence modeling module 206 dynamically calculates weights, such as content aware weights and sequence aware weights, for watched program embeddings 202 based on a program's similarity with the target show. The calculation of the weights will be described in more detail in FIG. 3. The output of watch sequence modeling module 206 is a watch history representation 208 and target program embedding 204. Target program embedding 204 may remain unchanged while passing through watch sequence modeling module 206. Watch history representation 208 may be a weighted representation of watched program embeddings 202. Other embeddings 210 may also be added. Other embeddings 210 may include the context for a recommendation, such as current time or a user's information (e.g. age and gender).

A predictor 212 receives watch history representation 208, target program embedding 204, and other embeddings 210. Then, predictor 212 generates a prediction for the target program. In some embodiments, the prediction may be a click through rate, which may predict whether the user will select the target program, such as a selection on user interface 112 is received to play the video for the target program.

Watch Sequence Modeling Module

Figure 3:
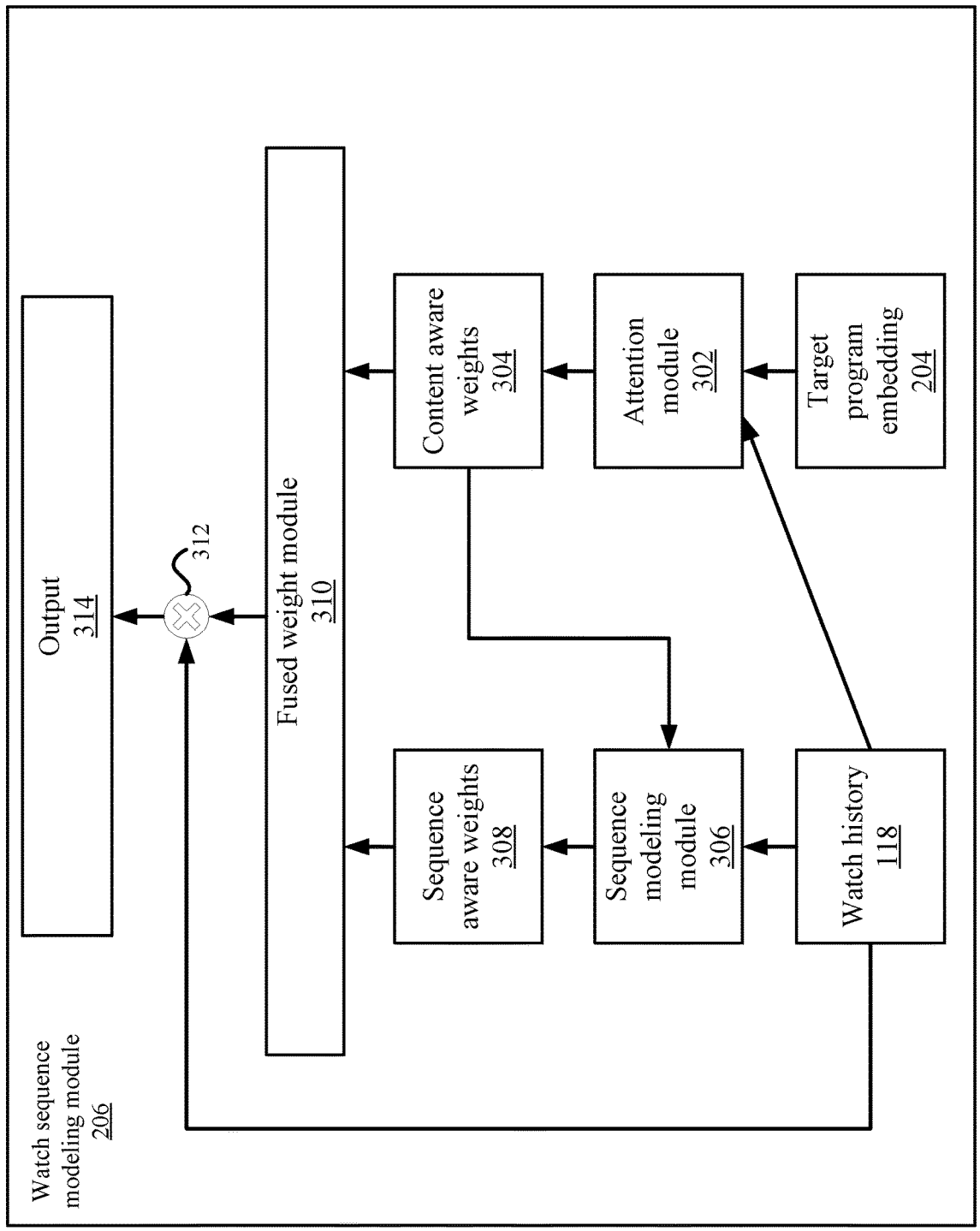
FIG. 3 depicts a more detailed example of a watch sequence modeling module according to some embodiments.

FIG. 3 depicts a more detailed example of watch sequence modeling module 206 according to some embodiments. An attention module 302 receives the embeddings for watch history 118 and target program embedding 204. Attention module 302 generates content aware weights 304, which are weights that are based on a comparison of characteristics of each watched program to characteristics of the target program. Content aware weights 304 may change based on a watched program's content similarity to the target program. Attention module 302 may compare characteristics of a watched program to characteristics of the target program to generate the content aware weights 304. The weights may be adjusted to indicate similarity between the watched program and the target program. The calculation of content aware weights 304 will be discussed in more detail in FIG. 4.

A sequence modeling module 306 receives the embeddings for watch history 118 and content aware weights 304 and also content aware weights 304. Sequence modeling module 306 then generates sequence aware weights 308, which are generated based on an order of the programs watched and content aware weights 304. Sequence aware weights 308 may characterize the importance of the order of programs to the target program. For example, sequence modeling module 306 determines which programs in watch history 118 may be considered more important to the user account based on the sequence of watch history 118. More details of sequence modeling module 306 will be described in FIG. 5.

A fused weight module 310 fuses the content aware weights 304 and sequence aware weights 308. For example, fused weight module 310 averages content aware weights 304 and sequence aware weights 308, but other methods may be used.

A multiplication block 312 combines the fused weights with the program embeddings for watch history 118. For example, multiplication block 312 may multiply each program embedding with a respective weight for the program. This weights each program in watch history 118 based on a respective fused weight for a program. An output 314 is a weighted program embedding for each program in watch history 118.

Attention Module

Figure 4:
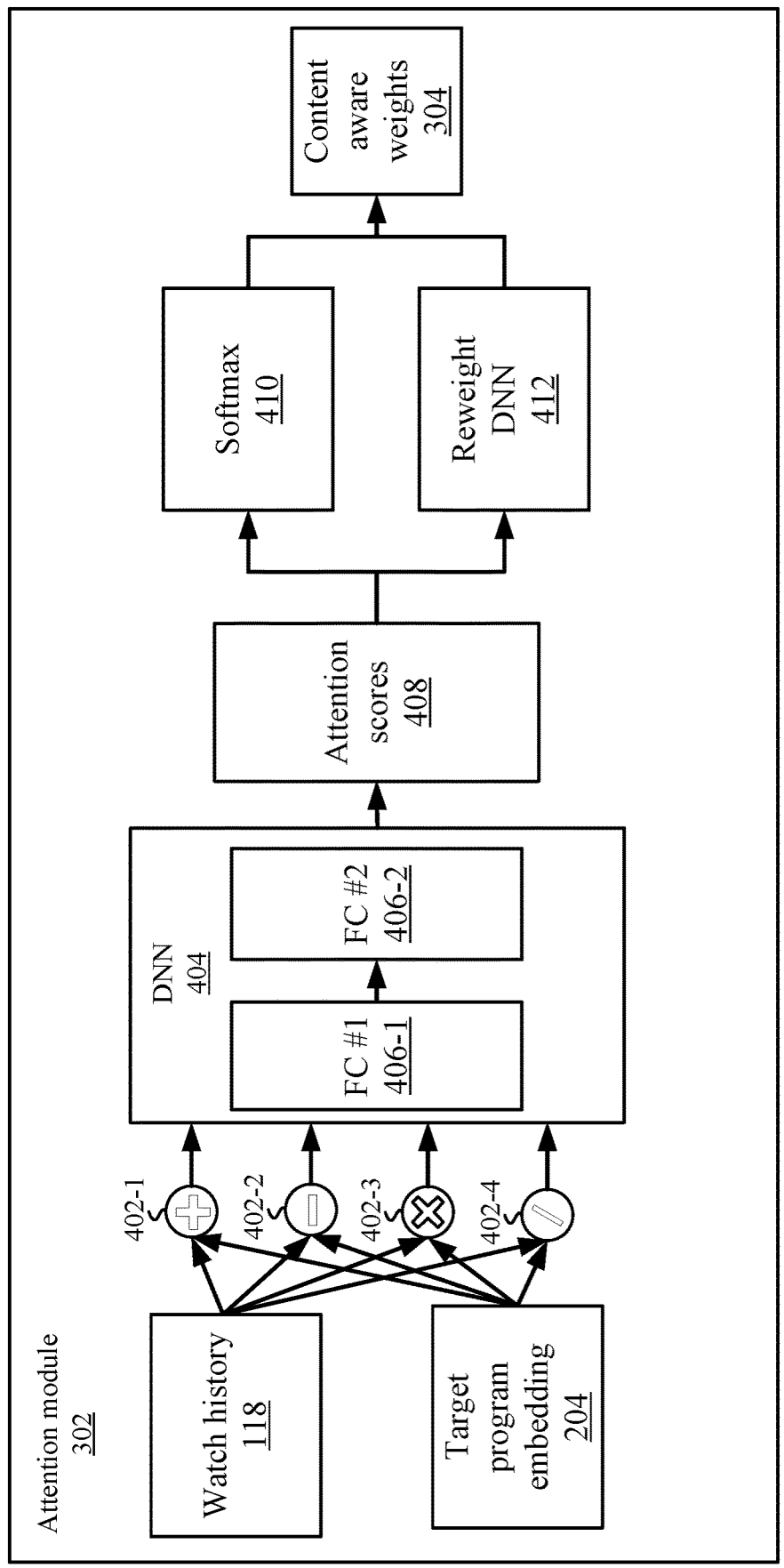
FIG. 4 depicts a more detailed example of an attention module according to some embodiments.

FIG. 4 depicts a more detailed example of attention module 302 according to some embodiments. Attention module 302 dynamically calculates content aware weights 304 for the embeddings in watch history 118 based on the embedding's content similarity with the embedding of the target show. Attention module 302 receives the embeddings of watch history 118 and target program embedding 204 as input. Attention module 302 compares the embeddings of watch history 118 and target program embedding 204. Attention module 302 may use different methods to calculate differences between the embeddings, such as by calculating a sum operation, a multiplication operation, a division operation, and a subtraction operation with each embedding of a watched program and the embedding of the target show. The sum operation adds the embeddings together, the multiplication operation multiplies the embeddings together, the division operation divides the embeddings, and the subtraction operation subtracts the embeddings. Other comparisons may also be performed. The comparisons create different measurements of the differences between the embeddings of watch history 118 and target program embedding 204. Attention module 302 may then concatenate the results together to form a new embedding that includes results of all the comparisons.

A prediction network, such as a deep neural network (DNN) 404, calculates attention scores 408, which may be raw scores for each watched show. DNN 404 may include a fully connected layer (FC1) 406-1 and a fully connected layer (FC2) 406-2, but different numbers of layers may be used to calculate attention scores 408. DNN 404 includes several layers, each layer receives the input feature sequence (an array of real numbers) and multiplies the sequence by a parameter matrix and passes the results through a non-linear function to calculate an output feature sequence. Using several layer-wise calculations (as described by fully connected layers 406-1 and 406-2), DNN 404 calculates the final output. Attention scores 408 may be a direct prediction output of DNN 404 for similarity of programs to the target program, which may be any real number.

In a branch, a Softmax layer 410 receives attention scores 408 and normalizes the weights between a range, such as between 0 to 1.0. A reweight DNN 412 receives attention scores 408 and may generate calibration weights for attention scores 408. Reweight DNN 412 may include a number of fully connected layers (not shown), such as two or three, to generate the calibration weights. The reweighting may extend the range of each program's weights that are generated by passing attention scores 408 through Softmax layer 410 so that the sum of the weights can exceed (e.g., by above 1.0) or fall within a range output by Softmax layer 410 (e.g., 0 to 1.0). The reweighting may improve prediction accuracy by increasing weights of programs that are more similar to the target program (such as beyond the range output by Softmax layer 410) and decreasing weights of programs that are not as similar to the target program.

Attention module 302 then merges the calibration weights with the normalized weights to output the final content aware weights 304. The merging may change the weights output by Softmax layer 410 to better represent the weights for the programs. Attention module 302 may output a higher weight for an embedding for a program in watch history 118 when it is determined the embedding is more similar to target program embedding 204 than another embedding for another program in watch history 118.

Sequence Modeling Module

Figure 5:
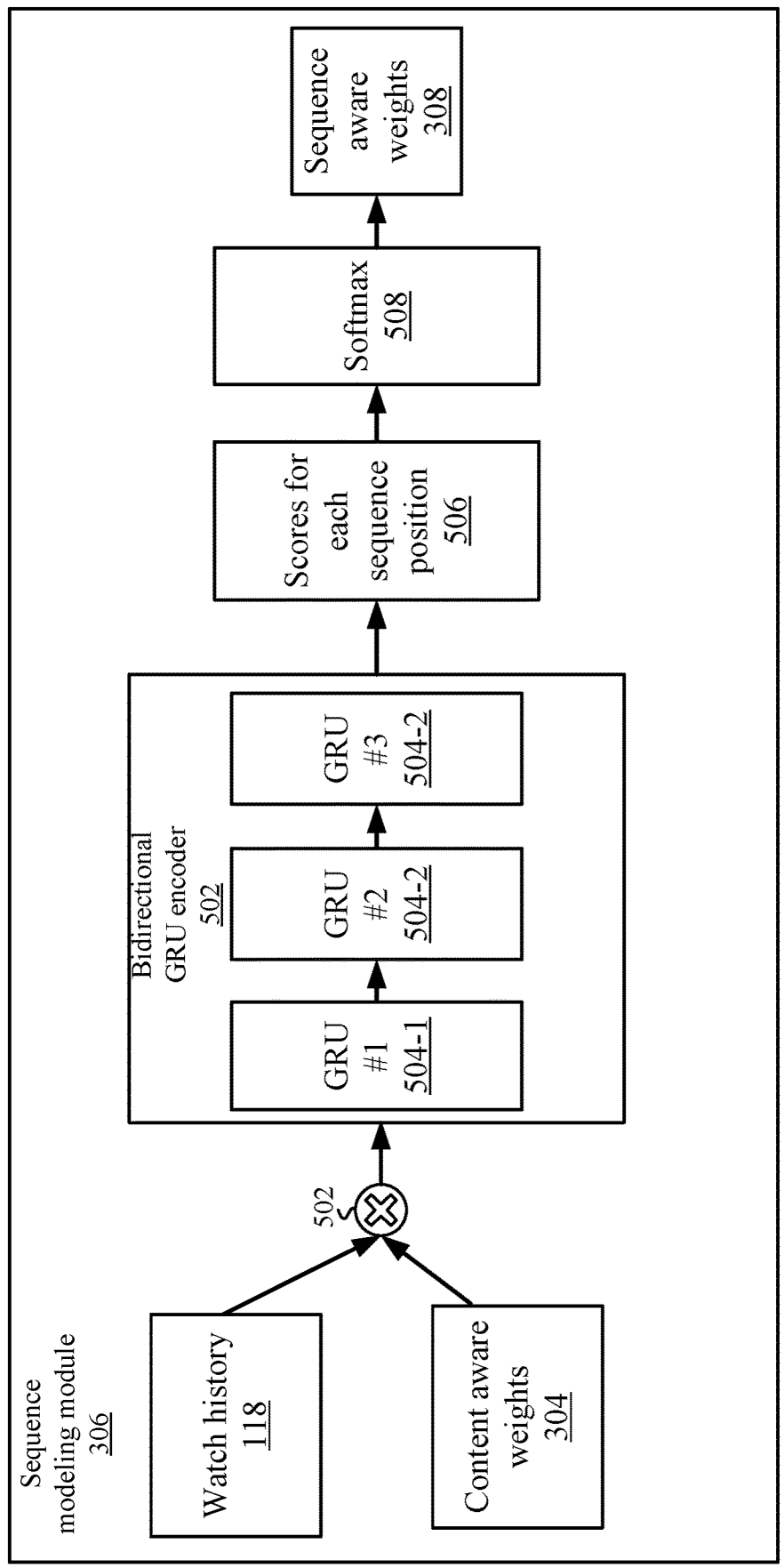
FIG. 5 depicts a more detailed example of a sequence modeling module according to some embodiments.

FIG. 5 depicts a more detailed example of sequence modeling module 306 according to some embodiments. Sequence modeling module 306 may model the sequential relationship between the watched shows in watch history 118. Sequence modeling module 306 compensates for the inability of attention module 302 to model the sequential relationship between programs in watch history 118. That is, attention module 302 compares the similarity of content in the programs in watch history 118 to the content of the target program, but attention module 302 may not use the order of the programs in watch history 118 to generate content aware weights 304.

Sequence modeling module 306 combines (e.g., multiplies, adds, or performs another combination operation) watched program embeddings 202 of watch history 118 with content aware weights 304 at multiplication block 502. The combination applies content aware weights 304 to each watched program embedding 202 of watch history 118. Using content aware weights 304 takes the similarity of the program to the target program into account when generating sequence aware weights 308. For example, a program that is more similar to the target program may be weighted higher when generating sequence aware weights 308. Incorporating content aware weights in the process of calculating sequence aware weights 308 is based on the consideration that while modeling evolution of user account's interest over time, the content aware weights may focus on the interests (e.g., programs) that are similar to the target show. For example, if the target show is an action movie, and user account's watch sequence indicates the user account has watched several programs classified as action movies, but more thriller movies recently (e.g. the user account's interest has evolved to the mixture of thriller and action movies), without the input of content aware weights 304, sequence modeling module 306 may rate the more recently watched thriller movies with higher weights rather than the action movies because the thriller movies were watched more recently. However, with the input of content aware weights 304, sequence modeling module 306 can analyze hidden evolved interests (e.g., less recent interests) that are similar to the target show.

An encoder 502, such as a bidirectional gated recurrent unit (GRU) encoder, models the sequential relationship between programs in watch history 118. Encoder 502 gradually reduces the feature dimension layer by layer to reduce computation cost. Encoder 502 can achieve sequence modelling under a feasible computation cost required in an online real-time environment. The encoder structure may be a pyramid-like structure that reduces the number of feature dimensions layer by layer to reduce the theoretical computation cost. For example, if encoder 502 receives a sequence of 128-dimensions in an embedding, encoder 502 may reduce the dimensions to 16 dimensions, and later one dimension, which makes the total computation cost proportional to n*128*16 where n stands for sequence length. In contrast to a conventional GRU based modeling method, the complexity may be much higher as n*128*128. In some embodiments, encoder 502 uses a lightweight GRU encoder that includes a number (e.g., 3) bidirectional GRU layers as shown as GRU #1 504-1, GRU #2 504-2, and GRU #3 504-3. Each layer may reduce the number of dimensions as discussed above. Encoder 502 calculates a weight for each program, such as a 1-dimensional weight for each program. For example, encoder 502 generates scores for each sequence position 506 based on an importance of the order in watch history 118. The scores may weight watched program embeddings 202 that are more important in the sequence higher.

In some examples, assuming the target show is romantic movie, a user account watch sequence may be [T, A, A, R, R, R], where (T stands for thriller, A stands for action movie, and R stands for romantic movie). Then, according to a watch history that indicates a user has been watching romantic movies recently, and the target program is also a romantic movie, the weights might be [0.01, 0.02, 0.02, 0.35, 0.30, 0.30]. The romantic movies are given a higher weight because they are more similar to the target program. In a second example, assuming the target show is a romantic movie, the watch history sequence may be [T, T, A, R, A, A]. Then according to the watch history, which indicates the user account has been watching action movies recently, and the target show is a romantic movie, the weights might be [0.02, 0.02, 0.23 0.18, 0.28, 0.27]. Note here the romantic movie among action movies are granted a relatively similar weight 0.18 in the sequence because the romantic movie is similar to the target program. That is, the content aware weights are used to increase the weight to the romantic movie.

A Softmax layer 508 may normalize the scores to a range to produce sequence aware weights 308, where each watched program embeddings 202 may be associated with sequence aware weights 308. Accordingly, sequence modeling module 306 uses content aware weights 304 to generate sequence aware weights 308 that are based on an importance of a respective watched program embedding 202 in the sequence of watch history 118.

Predictor

Figure 6:
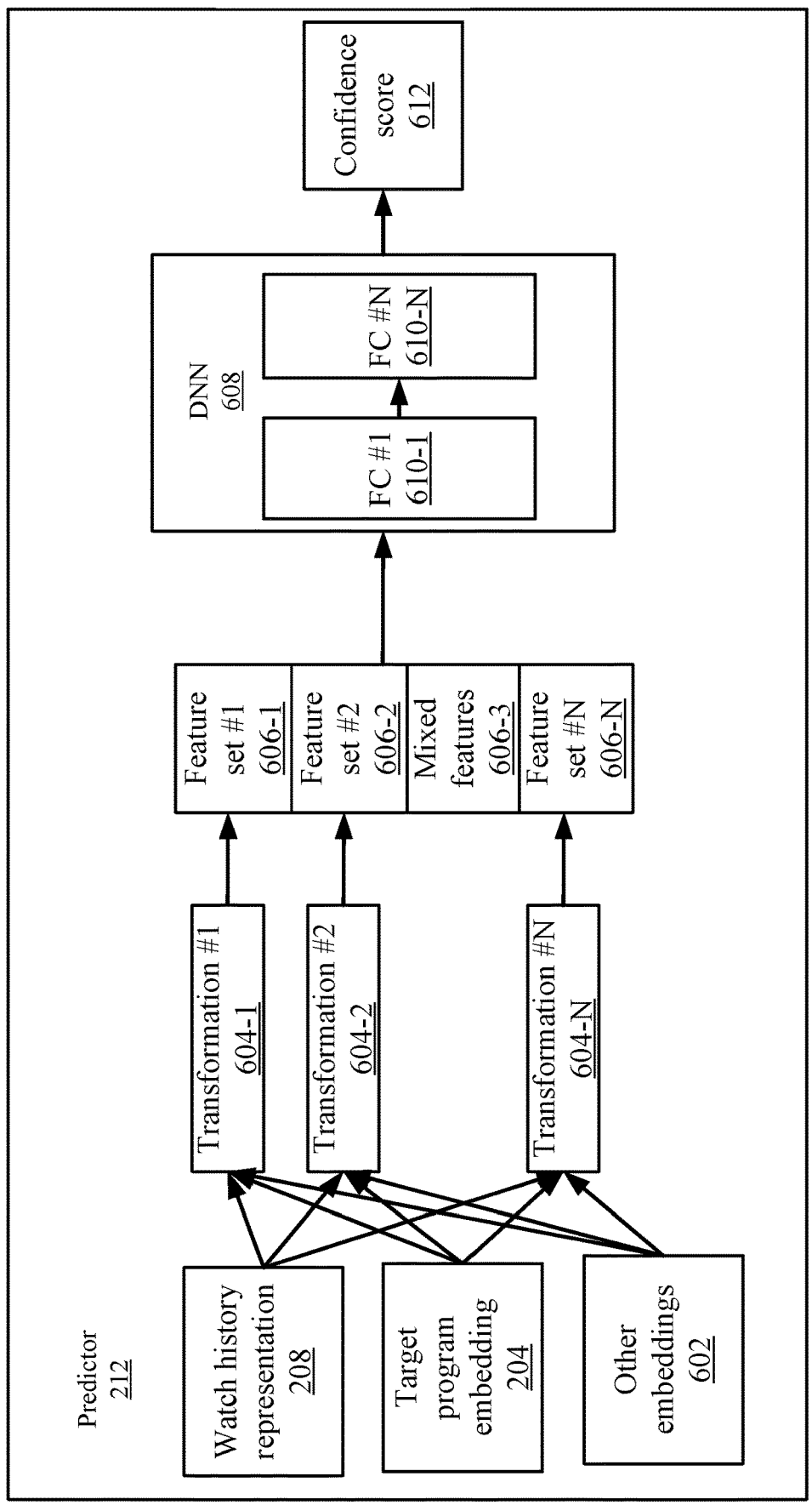
FIG. 6 depicts a more detailed example of a predictor according to some embodiments.

FIG. 6 depicts a more detailed example of predictor 212 according to some embodiments. Although this example of predictor 212 is described, other structures to generate a prediction may be used. Predictor 212 receives watch history representation 208, target show embedding 204, and other embeddings 602. Watch history representation 208 may be an embedding for watched program embeddings 202 in watch history 118. The embedding uses the weighted program embedding for each program in watch history 118. As discussed above in FIG. 3, the weighted program embedding uses sequence aware weights 308 and content aware weights 304 to model the importance of respective programs and the order of the programs in watch history 118.

Predictor 212 performs a series of transformations with various kinds of input combinations from watch history representation 208, target show embedding 204, and other embeddings 602. The transformed embeddings/features are concatenated into feature set #1 606-1, feature set #2 606-2, mixed features 606-3, and feature set #N 606-N. The feature set represents the combinations of watch history representation 208, target show embedding 204, and other embeddings 602. Feature sets 606 are input into a DNN 608 to generate a prediction as a confidence score 612. Confidence score 612 may include various information that can be interpreted, such as a similarity of the target program to the programs in watch history 118, a similarity of a recommendation context to the target program, and so on. The recommendation context may be a characteristic that is being used to determine similarity between the target program and programs in watch history 118.

All the DNNs mentioned above are comprised of several fully connected layers (noted as FC #1 610-1, FC #N 610-N) with activation and some of them with batch normalization. A Softmax layer may be used to restrict the output of DNN 608 to a range of scores, but is not shown.

Recommendation Process

Figure 7:
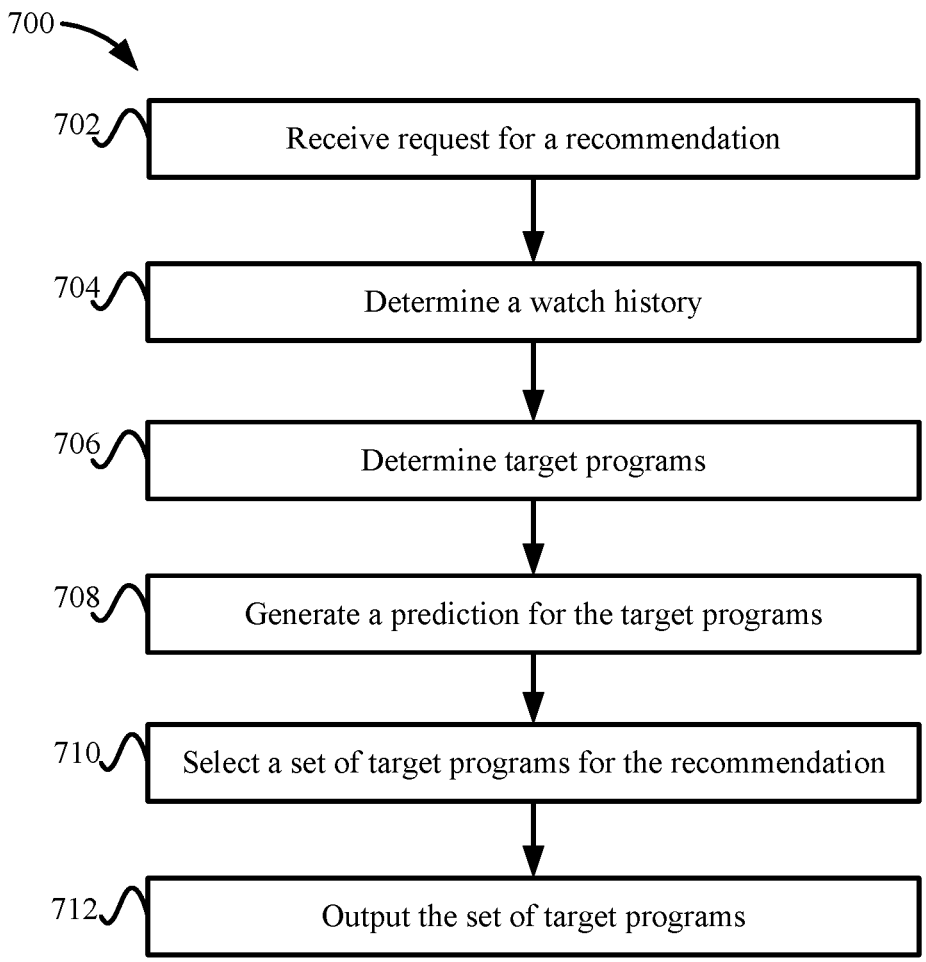
FIG. 7 depicts a simplified flowchart of the recommendation process according to some embodiments.

FIG. 7 depicts a simplified flowchart 700 of the recommendation process according to some embodiments. At 702, recommendation system 106 receives a request for a recommendation. The recommendation may be generated in different situations, such as in an online real-time environment. For example, client 104 may be browsing interface 112 and a new page of interface 112 requires a recommendation. Also, client 104 may send a search query to recommendation system 106.

At 704, recommendation system 106 determines a watch history 118 for a user account of client 104. Watch history 118 may be based on programs watched by the user account within a time limit.

At 706, recommendation system 106 determines target programs. The target programs may be all target programs eligible to be recommended for the request. In other examples, the target programs may be a subset of target programs, such as target programs that are newly released or part of a defined collection of target programs (e.g., comedies).

At 708, recommendation system 106 generates a prediction for the target programs. As discussed above, the prediction may be a confidence score for each target program that indicates a similarity to programs in watch history 118.

At 710, recommendation system 106 selects a set of target programs for the recommendation. For example, recommendation system 106 selects a top N target programs from a list of ranked target programs based on the confidence scores.

At 712, recommendation system 106 outputs the set of target programs. For example, server system 102 may send the set of target programs to client 104 for display on interface 112.

CONCLUSION

Accordingly, recommendation system 106 generates recommendations based on content aware weights and sequence aware weights. The recommendations may be more accurate because the sequence of the order of watching programs is modeled using the content aware weights. The sequence may identify programs in watch history 118 that are more important to a user account's preference or interest. Also, the order of which programs are watched provides insight into the evolution of interest or preference of a user account. Using the order thus refines the content similarity of programs in a watch history to a target program.

Embodiments

In some embodiments, a method comprising: selecting, by a computing device, a sequence of programs watched by a user account; calculating, by the computing device, a first set of weights based on comparing content of the sequence of programs to content of a target program; calculating, by the computing device, a second set of weights based on an order of the sequence of programs and the first of weights; and applying, by the computing device, the first set of weights and the second set of weights to the sequence of programs to generate a prediction of a similarity of the sequence of programs to the target program; and outputting, by the computing device, the prediction of the similarity for use in determining a recommendation for the user account.

In some embodiments, calculating the first set of weights comprises: calculating a comparison of a representation for the sequence of programs and a representation for the target program; and using the comparison to generate the first set of weights.

In some embodiments, calculating the first set of weights comprises: generating scores for each program in the sequence of programs based on the comparison.

In some embodiments, calculating the first set of weights comprises: generating calibration weights for the scores for each program; and using the calibration weights to adjust the scores, wherein the first set of weights are based on the adjusted scores.

In some embodiments, the representation for the sequence of programs comprises a plurality of embeddings for the sequence of programs and the representation for the target program comprises an embedding for the target program, the plurality of embeddings describe characteristics of the sequence of programs in an embedding space, and the embedding for the target program describes characteristics of the target program in the embedding space.

In some embodiments, calculating the second set of weights comprises: combining a representation for the first set of weights and a representation for the sequence of programs.

In some embodiments, combining the representation for the first set of weights and the representation for the sequence of programs comprises: weighting a representation for each of the programs in the sequence of programs by a respective weight in the first set of weights.

In some embodiments, combining the representation for the first set of weights and the representation for the sequence of programs comprises: calculating a weight for each respective position in the order of the sequence of programs, wherein the second set of weights is based on the weight for each respective position.

In some embodiments, calculating the weight for each respective position comprises using a plurality of layers to calculate the second set of weights, wherein each layer in the plurality of layers reduces a number of features that are analyzed.

In some embodiments, the representation for the sequence of programs comprises a plurality of embeddings for the sequence of programs, and the first set of weights is used to weight the plurality of embeddings.

In some embodiments, applying the first set of weights and the second set of weights to the sequence of programs to generate the prediction comprises: generating a score for the prediction that represents the similarity of the sequence of programs to the target program.

In some embodiments, the method further comprising: using the score for the prediction to determine whether to recommend the target program to the user account.

In some embodiments, the score for the prediction predicts whether the user account will select the target program on an interface.

In some embodiments, the method further comprising: generating a prediction for a plurality of target programs, wherein each prediction represents the similarity of the sequence of programs to a target program in the plurality of target programs; and using the prediction for the plurality of target programs to select a set of target programs to recommend to the user account.

In some embodiments, a non-transitory computer-readable storage medium containing instructions, that when executed, control a computer system to be operable for: selecting a sequence of programs watched by a user account; calculating a first set of weights based on comparing content of the sequence of programs to content of a target program; calculating a second set of weights based on an order of the sequence of programs and the first of weights; and applying the first set of weights and the second set of weights to the sequence of programs to generate a prediction of a similarity of the sequence of programs to the target program; and outputting the prediction of the similarity for use in determining a recommendation for the user account.

In some embodiments, a method comprising: selecting, by a computing device, a sequence of programs watched by a user account; selecting, by the computing device, a plurality of target programs; for each target program, performing: calculating, by the computing device, a first set of weights based on comparing content of the sequence of programs to content of the target program; calculating, by the computing device, a second set of weights based on an order of the sequence of programs and the first of weights; and applying, by the computing device, the first set of weights and the second set of weights to the sequence of programs to generate a prediction of a similarity of the sequence of programs to the target program; and selecting, by the computing device, a portion of the plurality of target programs based on respective predictions for the plurality of target programs.

In some embodiments, the method further comprising: receiving a request for a recommendation; and outputting the portion of the plurality of target programs for the request.

In some embodiments, selecting the portion of the plurality of target programs comprises: ranking the plurality of target programs based on respective predictions; and selecting the portion of the plurality of programs based on the ranking.

In some embodiments, calculating the first set of weights comprises: calculating a comparison of a representation for the sequence of programs and a representation for the target program; and using the comparison to generate the first set of weights.

In some embodiments, calculating the second set of weights comprises: combining a representation for the first set of weights and a representation for the sequence of programs.

System

Figure 8:
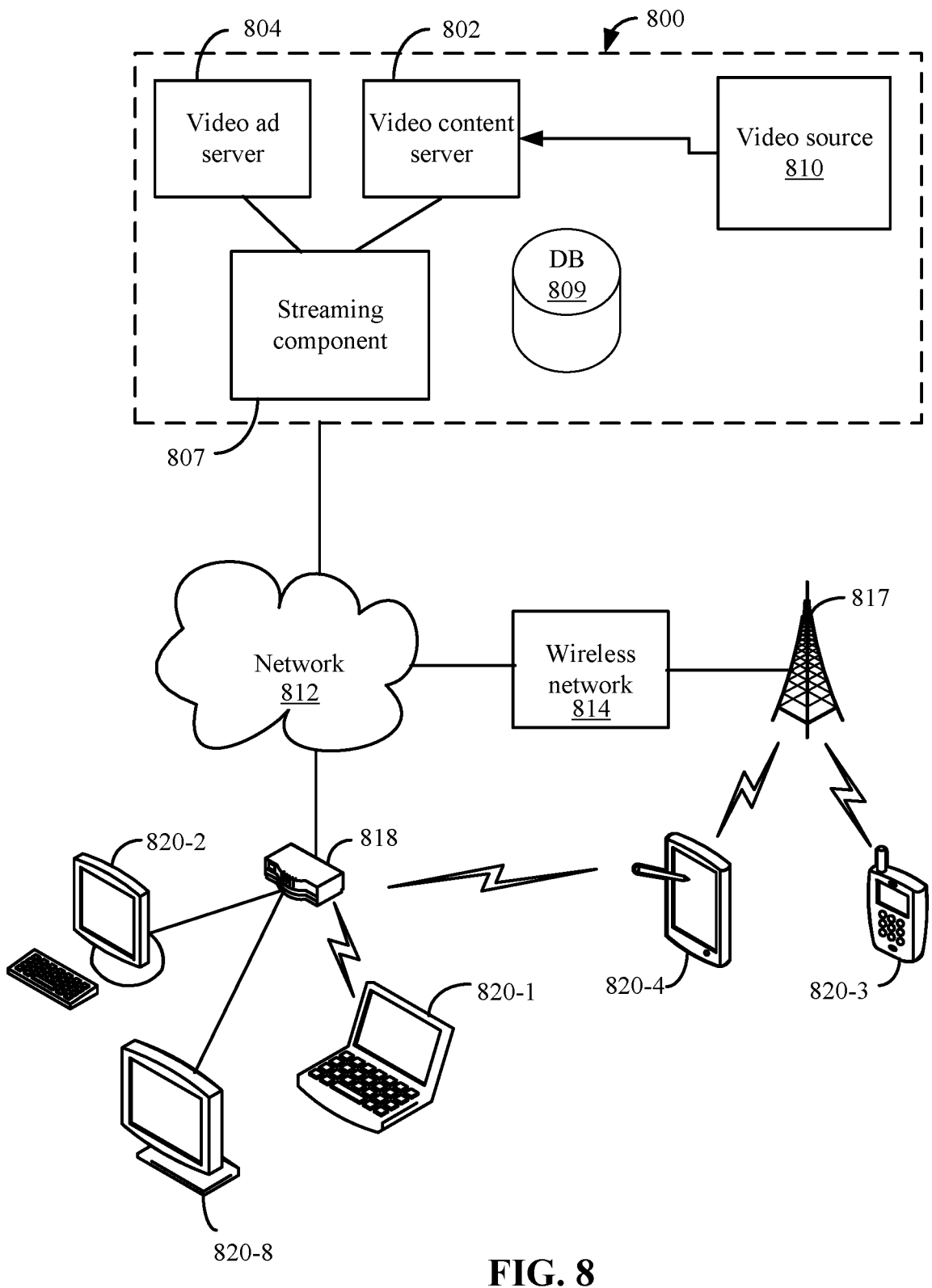
FIG. 8 depicts a video streaming system in communication with multiple client devices via one or more communication networks according to some embodiments.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In some embodiments, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
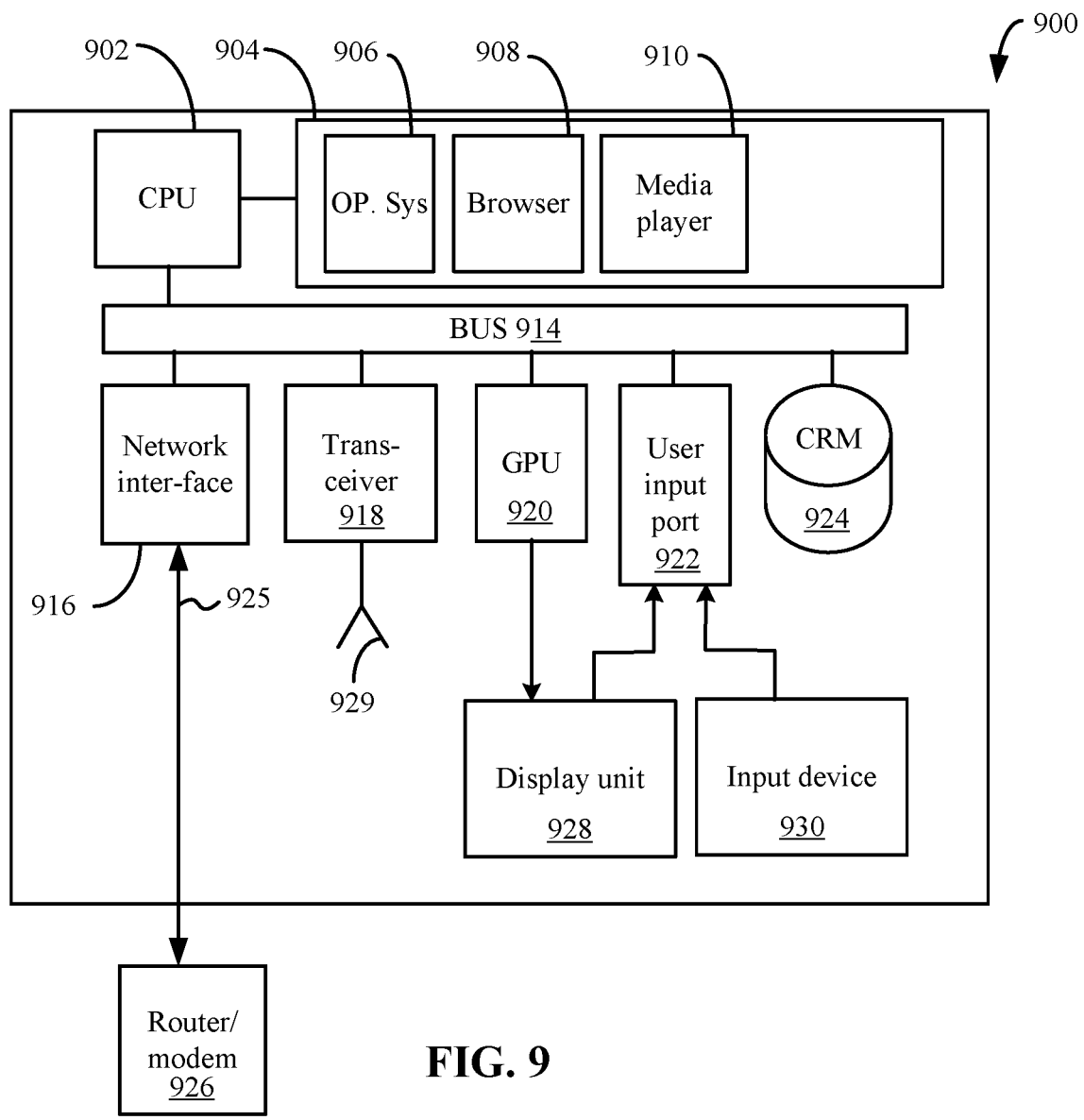
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   selecting, by a computing device, a sequence of programs watched by a user account;
   calculating, by the computing device, a first set of weights based on comparing content of programs in the sequence of programs to content of a target program;
   calculating, by the computing device, a second set of weights based on an order of the sequence of programs and the first of weights, wherein the second set of weights model a sequential relationship of programs in the order;
   applying, by the computing device, the first set of weights and the second set of weights to the sequence of programs to generate a prediction of a similarity of the sequence of programs to the target program; and
   outputting, by the computing device, the prediction of the similarity for use in determining a recommendation for the user account.

2. The method of claim 1, wherein calculating the first set of weights comprises:
   calculating a comparison of a representation for the sequence of programs and a representation for the target program; and
   using the comparison to generate the first set of weights.

3. The method of claim 2, wherein calculating the first set of weights comprises:
   generating scores for each program in the sequence of programs based on the comparison.

4. The method of claim 3, wherein calculating the first set of weights comprises:
   generating calibration weights for the scores for each program; and
   using the calibration weights to adjust the scores, wherein the first set of weights are based on the adjusted scores.

5. The method of claim 2, wherein:
   the representation for the sequence of programs is based on a plurality of embeddings for the sequence of programs, and the representation for the target program comprises an embedding for the target program,
   the representation for the sequence of programs describes a characteristic of the sequence of programs in an embedding space, and
   the embedding for the target program describes a characteristic of the target program in the embedding space.

6. The method of claim 1, wherein calculating the second set of weights comprises:
   combining a representation for the first set of weights and a representation for the sequence of programs.

7. The method of claim 6, wherein combining the representation for the first set of weights and the representation for the sequence of programs comprises:
   weighting a representation for each of the programs in the sequence of programs by a respective weight in the first set of weights.

8. The method of claim 7, wherein combining the representation for the first set of weights and the representation for the sequence of programs comprises:
   calculating a weight for each respective position in the order of the sequence of programs, wherein the second set of weights is based on the weight for each respective position.

9. The method of claim 8, wherein calculating the weight for each respective position comprises using a plurality of layers to calculate the second set of weights, wherein each layer in the plurality of layers reduces a number of features that are analyzed.

10. The method of claim 6, wherein:
    the representation for the sequence of programs is based on a plurality of embeddings for the sequence of programs, and
    the first set of weights is used to weight the plurality of embeddings.

11. The method of claim 1, wherein applying the first set of weights and the second set of weights to the sequence of programs to generate the prediction comprises:
    generating a score for the prediction that represents the similarity of the sequence of programs to the target program.

12. The method of claim 11, further comprising:
    using the score for the prediction to determine whether to recommend the target program to the user account.

13. The method of claim 11, wherein the score for the prediction predicts whether the user account will select the target program on an interface.

14. The method of claim 1, further comprising:
    generating a prediction for a plurality of target programs, wherein each prediction represents the similarity of the sequence of programs to a target program in the plurality of target programs; and using the prediction for the plurality of target programs to select a set of target programs to recommend to the user account.

15. A non-transitory computer-readable storage medium containing instructions, that when executed, control a computer system to be operable for:

selecting a sequence of programs watched by a user account;

calculating a first set of weights based on comparing content of programs in the sequence of programs to content of a target program;

calculating a second set of weights based on an order of the sequence of programs and the first of weights, wherein the second set of weights model a sequential relationship of programs in the order;

applying the first set of weights and the second set of weights to the sequence of programs to generate a prediction of a similarity of the sequence of programs to the target program; and outputting the prediction of the similarity for use in determining a recommendation for the user account.

16. A method comprising:

selecting, by a computing device, a sequence of programs watched by a user account;

selecting, by the computing device, a plurality of target programs;

for each target program, performing:

calculating, by the computing device, a first set of weights based on comparing content of programs in the sequence of programs to content of the target program;

calculating, by the computing device, a second set of weights based on an order of the sequence of programs and the first of weights, wherein the second set of weights model a sequential relationship of programs in the order; and applying, by the computing device, the first set of weights and the second set of weights to the sequence of programs to generate a prediction of a similarity of the sequence of programs to the target program; and selecting, by the computing device, a portion of the plurality of target programs based on respective predictions for the plurality of target programs.

17. The method of claim 16, further comprising:

receiving a request for a recommendation; and outputting the portion of the plurality of target programs for the request.

18. The method of claim 16, wherein selecting the portion of the plurality of target programs comprises:

ranking the plurality of target programs based on respective predictions; and selecting the portion of the plurality of programs based on the ranking.

19. The method of claim 16, wherein calculating the first set of weights comprises:

calculating a comparison of a representation for the sequence of programs and a representation for the target program; and using the comparison to generate the first set of weights.

20. The method of claim 16, wherein calculating the second set of weights comprises:

combining a representation for the first set of weights and a representation for the sequence of programs.

* * * * *